(12) United States Patent
Hu et al.

(10) Patent No.: US 9,414,258 B2
(45) Date of Patent: Aug. 9, 2016

(54) METHOD AND APPARATUS FOR PROCESSING BEARER

(71) Applicant: Huawei Technologies Co., LTD, Shenzhen (CN)

(72) Inventors: Xiang Hu, Beijing (CN); Zhiyu Di, Shenzhen (CN); Shaohui Hou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 14/142,314

(22) Filed: Dec. 27, 2013

(65) Prior Publication Data

US 2014/0112146 A1    Apr. 24, 2014

Related U.S. Application Data

(63) Continuation of application No. PCT/CN2011/076766, filed on Jul. 1, 2011.

(51) Int. Cl.
*H04W 28/02* (2009.01)
*H04W 76/02* (2009.01)
*H04L 12/851* (2013.01)
*H04W 28/18* (2009.01)

(52) U.S. Cl.
CPC ....... *H04W 28/0263* (2013.01); *H04L 47/2441* (2013.01); *H04W 28/0252* (2013.01); *H04W 76/022* (2013.01); *H04W 28/18* (2013.01)

(58) Field of Classification Search
CPC .................................................. H04W 28/0263
See application file for complete search history.

(56) References Cited

U.S. PATENT DOCUMENTS

| 2009/0016344 A1* | 1/2009 | Hu et al. ............... 370/389 |
| 2010/0067400 A1 | 3/2010 | Dolganow et al. |
| 2010/0202351 A1 | 8/2010 | Xi et al. |
| 2010/0235877 A1 | 9/2010 | Hu et al. |

(Continued)

FOREIGN PATENT DOCUMENTS

| CN | 101043644 A | 9/2007 |
| CN | 101674606 A | 3/2010 |

(Continued)

OTHER PUBLICATIONS

Ekstrom, H., "QoS Control in the 3GPP Evolved Packet System," LTE-3GPP Release 8, IEEE Communications Magazine, Feb. 2009, pp. 76-83.

(Continued)

*Primary Examiner* — Jason Mattis
(74) *Attorney, Agent, or Firm* — Slater Matsil, LLP (57) ABSTRACT

The present invention provides a method and an apparatus for processing a bearer. The method includes performing depth packet inspection DPI processing on a traffic flow of a service according to a preset layer-7 protocol type matching rule. Alternatively, shallow packet inspection SPI processing is performed on a traffic flow of a service according to a preset layer-3 or layer-4 protocol type matching rule so as to obtain a DPI/SPI processing result. According to the DPI/SPI result and the preset matching rule, a service quality attribute parameter of the service is determined. The method further includes determining whether the service quality attribute parameter is the same as a service quality attribute parameter of an existing bearer, and if different, creating a dedicated bearer for the service.

18 Claims, 8 Drawing Sheets

(56) References Cited

U.S. PATENT DOCUMENTS

| | | | |
|---|---|---|---|
| 2011/0080886 A1 | 4/2011 | Chandrachood et al. | |
| 2012/0136992 A1* | 5/2012 | Lopez Nieto et al. | 709/224 |
| 2012/0147839 A1* | 6/2012 | Yin et al. | 370/329 |
| 2012/0246212 A1* | 9/2012 | Ahmad et al. | 709/201 |
| 2014/0241153 A1* | 8/2014 | Chowdhury | H04W 36/22 370/230 |

FOREIGN PATENT DOCUMENTS

| | | |
|---|---|---|
| CN | 101720075 A | 6/2010 |
| CN | 101720111 A | 6/2010 |
| EP | 2015524 A1 | 4/2007 |
| JP | 2010539758 A | 12/2010 |
| WO | 2009140325 A1 | 11/2009 |
| WO | 2010023645 A1 | 3/2010 |
| WO | 2010080966 A1 | 7/2010 |
| WO | 2010112077 A1 | 10/2010 |
| WO | 2011011790 A2 | 1/2011 |
| WO | 2011050928 A1 | 5/2011 |

OTHER PUBLICATIONS

"3rd Generation Partnership Project; Technical Specification Group Services and System Aspects; General Packet Radio Service (GPRS); Service description; Stage 2 (Release 10)," 3GPP TS 23.060 V10.4.0, Technical Specification, Jun. 2011, 320 pages.

"3rd Generation Partnership Poject; Technical Specification Group Services and System Aspects; General Packet Radio Services (GPRS) enhancements for Evolved Universal Terrestrial Radio Access Network (E-UTRAN) access (Release 10)," 3GPP TS 23.401 V10.4.0, Technical Specification, Jun. 2011, 280 pages.

Chinese Office Action, Application No. 201180001518.1, dated Mar. 4, 2013, 19 pages.

Chinese Search Report, Application No. PCT/CN2011/076766, dated Apr. 12, 2012, 16 pages.

* cited by examiner

METHOD AND APPARATUS FOR PROCESSING BEARER

This application is a continuation of International Application No. PCT/CN2011/076766, filed on Jul. 1, 2011, which is hereby incorporated by reference in its entirety.

TECHNICAL FIELD

The present invention relates to the field of communications technologies, and in particular, to a method and an apparatus for processing a bearer.

BACKGROUND

A next generation core network system architecture evolution SAE includes a mobility management network element, for example, a mobility management entity MME or an S4 GRPS service support node S4 SGSN, responsible for location management, connection management, security authentication, gateway selection, and the like of a mobile user terminal; a serving gateway S-GW, which is a gateway responsible for local access of a user terminal; a data gateway P-GW, which is a gateway responsible for a user terminal to access an external data network; and a policy and charging rule function PCRF, serving as a control node for quality of service QoS and charging policy. In the SAE network architecture, a policy decision point created according to a dedicated bearer described in a 3GPP standard TS 23.401 is defined in a policy server PCRF.

In the existing SAE network architecture, a dedicated bearer of a service needs to be triggered through the PCRF. Specifically, the creating of the dedicated bearer requires providing a related parameter of the service to the PCRF by an AF. The PCRF creates the dedicated bearer of the service according to the related parameter. However, in the existing policy and charging control PCC deployment solution, because of different deployment manners and ideas of operators, the application function AF has no concentration and is hard to be deployed, so that the PCC architecture function is basically based on static configuration, and cannot sense a service dynamically to apply different policies, thereby affecting the use and promotion of the PCRF creating the dedicated bearer. In addition, because the PCRF creates the dedicated bearer based on the related parameter reported by the AF, if it is intended to create the dedicated bearer through the PCRF, the AF needs to be deployed, which increases hardware overhead of a system.

SUMMARY OF THE INVENTION

In order to reduce system overhead of an SAE network architecture, in one aspect, the present invention provides a method for processing a bearer. The method includes performing depth packet inspection DPI processing on a traffic flow of a service according to a preset layer-7 protocol type matching rule so as to obtain a DPI processing result. A service quality attribute parameter of the service is determined according to the DPI result and the preset matching rule. The method further includes determining whether the quality attribute parameter is the same as a service quality attribute parameter of an existing bearer, and if different, creating a dedicated bearer for the service. Alternatively, a shallow packet inspection SPI processing is performed on a traffic flow of a service according to a preset layer-3 or layer-4 protocol type matching rule so as to obtain an SPI processing result. A service quality attribute parameter of the service is determined according to the SPI result and the preset matching rule. The method further includes determining whether the service quality attribute parameter is the same as a service quality attribute parameter of an existing bearer, and if different, creating a dedicated bearer for the service.

The present invention further provides a method for processing a bearer. The method includes performing depth packet inspection DPI processing on a traffic flow of a service according to a preset layer-7 protocol type matching rule so as to obtain a DPI processing result. Alternatively, shallow packet inspection SPI processing is performed on a traffic flow of a service according to a preset layer-3 or layer-4 protocol type matching rule so as to obtain an SPI processing result. A service quality attribute parameter of the service is determined according to the DPI/SPI result and the preset matching rule. The method further includes reporting the service quality attribute parameter of the service to a PCRF through an Rx interface so that the PCRF creates a dedicated bearer of the service according to the service quality attribute parameter of the service.

In another aspect, the present invention further provides an apparatus for processing a bearer. The apparatus includes a processing module configured to perform depth packet inspection DPI processing on a traffic flow of a service according to a preset layer-7 protocol type matching rule so as to obtain a DPI processing result. Alternatively, shallow packet inspection SPI processing is performed on a traffic flow of a service according to a preset layer-3 or layer-4 protocol type matching rule so as to obtain an SPI processing result. A service quality attribute parameter determining module is configured to determine a service quality attribute parameter of the service according to the DPI result and the preset matching rule. Alternatively, according to the SPI result and the preset matching rule, a service quality attribute parameter of the service is determined. A dedicated bearer creating module is configured to determine whether the service quality attribute parameter is the same as a service quality attribute parameter of an existing bearer, and if different, create a dedicated bearer for the service.

In another aspect, the present invention further provides an apparatus for processing a bearer. The apparatus includes a processing module configured to perform depth packet inspection DPI processing on a traffic flow of a service according to a preset layer-7 protocol type matching rule so as to obtain a DPI processing result. Alternatively, shallow packet inspection SPI processing is performed on a traffic flow of a service according to a preset layer-3 or layer-4 protocol type matching rule so as to obtain an SPI processing result. A service quality attribute parameter determining module is configured to determine a service quality attribute parameter of the service according to the DPI result and the preset matching rule or according to the SPI result and the preset matching rule. A dedicated bearer creating module is configured to report the service quality attribute parameter of the service to a PCRF through an Rx interface so that the PCRF creates a dedicated bearer of the service according to the service quality attribute parameter of the service.

In various embodiments of the present invention, depth packet inspection DPI/shallow packet inspection SPI is performed on a traffic flow of a service so as to obtain a DPI/SPI processing result. According to the DPI/SPI result and a preset matching rule, a service quality attribute parameter of the service is determined. It is further determined whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increases diversity of a dedicated bearer creating apparatus.

BRIEF DESCRIPTION OF THE DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and a person of ordinary skill in the art may still derive other drawings according to these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
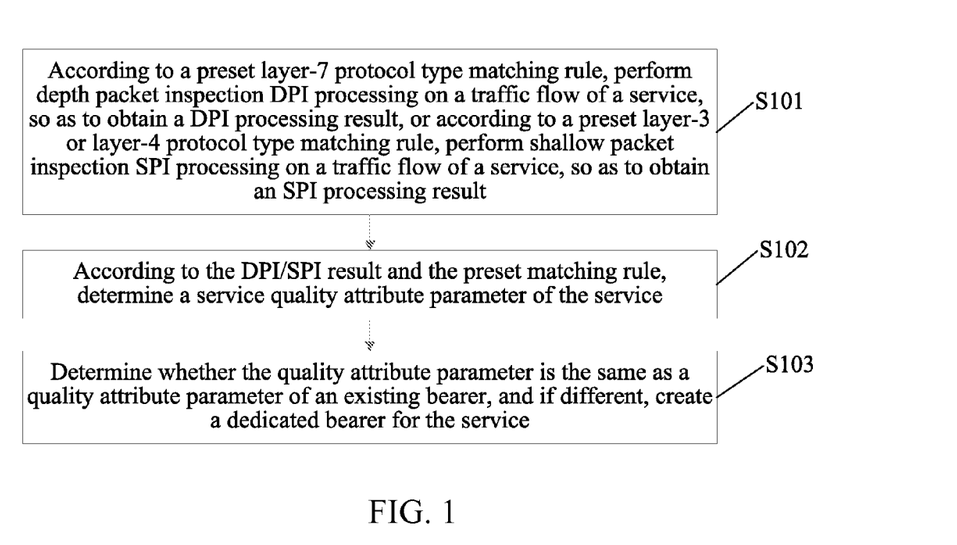
FIG. 1 is a flow chart of a method for processing a bearer according to Embodiment 1 of the present invention.

FIG. 1 is a flow chart of an embodiment of a method for processing a bearer according to the present invention; the method is applied to a scenario in which a dedicated bearer service is created in a 4G or 3G network without a PCRF. A 4G network is a network of a next generation core network SAE, and the network architecture includes: a mobility management entity MME or an S4 SGSN, responsible for location management, connection management, security authentication, and gateway selection, including selection of a serving gateway, a data gateway, and the like, of a mobile user terminal; a serving gateway S-GW, which is a local access gateway of a user terminal; a data gateway P-GW, which is a gateway for a user terminal to access an external data network; and a PCRF, serving as a control node of QoS and charging policy. The 3G network at least includes: a gateway GPRS support node GGSN, configured to initiate a PDP connection activation to an SGSN; an SGSN, configured to send a secondary context activation request to a mobile station MS, so that the MS initiates a procedure of secondary context activation, where the secondary context activation request carries a Linked TI, a TI, a QoS Requested, a TFT, and a protocol configuration item.

The method mainly includes the following steps described below.

S101: According to a preset layer-7 protocol type matching rule, perform depth packet inspection DPI processing on a traffic flow of a service, so as to obtain a DPI processing result. Alternatively, according to a preset layer-3 or layer-4 protocol type matching rule, shallow packet inspection SPI (L3/4SPI) processing is performed on a traffic flow of a service so as to obtain an SPI processing result.

S102: A service quality attribute parameter of the service is determined according to the DPI result and the preset matching rule or according to the SPI result and the preset matching rule.

The service quality attribute parameter of the service specifically includes: a QoS class identifier identifying a quality class of the service and an allocation and retention priority ARP, and the step of determining whether the service quality attribute parameter is the same as a service quality attribute parameter of an existing bearer, and if different, a dedicated bearer is created for the service. It is determined whether the QoS class identifier and the ARP are the same as a QoS class identifier and an ARP of the existing bearer, and if at least one is different, a dedicated bearer is created for the service.

S103: Determine whether the service quality attribute parameter is the same as a service quality attribute parameter of an existing bearer, and if different, a dedicated bearer is created for the service.

The existing bearer is a default bearer or an existing dedicated bearer.

In this embodiment, the creating a dedicated bearer for the service may specifically be: acquiring a 5-tuple of the service, and a GBR and an MBR of the service; creating a dedicated bearer of the service according to the 5-tuple of the service and the GBR and MBR of the service, where a traffic flow template TFT parameter of the dedicated bearer is the 5-tuple of the service, and a bandwidth of the dedicated bearer is a sum of the service GBR and MBR.

The 5-tuple of the service and the GBR and MBR of the service may be acquired through performing depth packet inspection DPI processing on the traffic flow of the service according to the preset layer-7 protocol type matching rule in S101. Alternatively, they may be acquired through performing shallow packet inspection SPI on the traffic flow of the service according to the preset layer-3 or layer-4 protocol type matching rule, and a specific acquisition manner is not limited in this embodiment.

Optionally, after S103 in this embodiment, this embodiment may further include triggering an update procedure of the existing bearer when it is determined that the service quality attribute parameter is different from the service quality attribute parameter of the existing bearer.

The service quality attribute parameter of the service specifically includes: a QoS class identifier identifying a quality class of the service and an allocation and retention priority ARP; the step of when it is determined that the service quality attribute parameter is different from the service quality attribute parameter of the existing bearer, triggering an update procedure of the existing bearer specifically includes: determining whether the QoS class identifier and the ARP are the same as a QoS class identifier and an ARP of the existing bearer, and if the same, triggering an update procedure of the existing dedicated bearer.

Further, when the existing bearer is a default bearer, the triggering an update procedure of the existing dedicated bearer may be performed by sending a default bearer update request. When the existing bearer is an existing dedicated bearer, the triggering an update procedure of the existing dedicated bearer may include acquiring a 5-tuple of the service, and a GBR and an MBR of the service, and adding the 5-tuple of the traffic flow into a TFT parameter of the existing dedicated bearer, and adding a GBR and an MBR of the existing dedicated bearer with the GBR and MBR of the service so as to obtain an accumulated value of the GBR and MBR. The accumulated value of the GBR and MBR may be used as the GBR and MBR of the existing dedicated bearer.

Optionally, after S103 in this embodiment, this embodiment may further include updating the existing bearer when the existing bearer does not receive a traffic flow of the service within a preset period, and/or when it is detected through an SPI/DPI technology that the service is already disconnected and a traffic flow is no longer generated. Specifically, when the existing bearer is an existing dedicated bearer, the triggering an update procedure of the existing dedicated bearer includes: acquiring a 5-tuple of the service, and a GBR and an MBR of the service; subtracting the 5-tuple of the traffic flow from a TFT parameter of the existing dedicated bearer; subtracting the GBR and MBR of the service from a GBR and an MBR of the existing dedicated bearer so as to obtain an updated accumulated value of the GBR and MBR; and using the updated accumulated value of the GBR and MBR as the GBR and MBR of the dedicated bearer.

Optionally, after S103 in this embodiment, this embodiment may further include initiating a deletion procedure of the dedicated bearer so as to delete the dedicated bearer when all services carried by the dedicated bearer stop transmitting traffic flows.

It should be noted that, this embodiment may be applied to a 3G network environment or a 4G network environment, when current network environment is the 3G network environment, the QoS class identifier is a traffic class Traffic Class. Alternatively, when current network environment is the 4G network environment, the QoS class identifier is a service QoS class identifier QCI. Preferably, when current network environment is the 4G network environment, a value range of the allocation and retention priority ARP is 1 to 15, and when current network environment is the 3G network environment, a value range of the allocation and retention priority ARP is 1 to 3. In this embodiment, when the method is applied to the 4G network, an execution body of the steps may be a PDN gateway having functions of the foregoing steps. When the method is applied to the 3G network, an execution body of the steps may be a GGSN having functions of the foregoing steps.

In the embodiments of the present invention, perform depth packet inspection DPI/shallow packet inspection SPI on a traffic flow of a service, so as to obtain a DPI/SPI processing result, and according to the DPI/SPI result and a preset matching rule, determine a service quality attribute parameter of the service, further determine whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increase diversity of a dedicated bearer creating apparatus.

Embodiment 2

Figure 2:
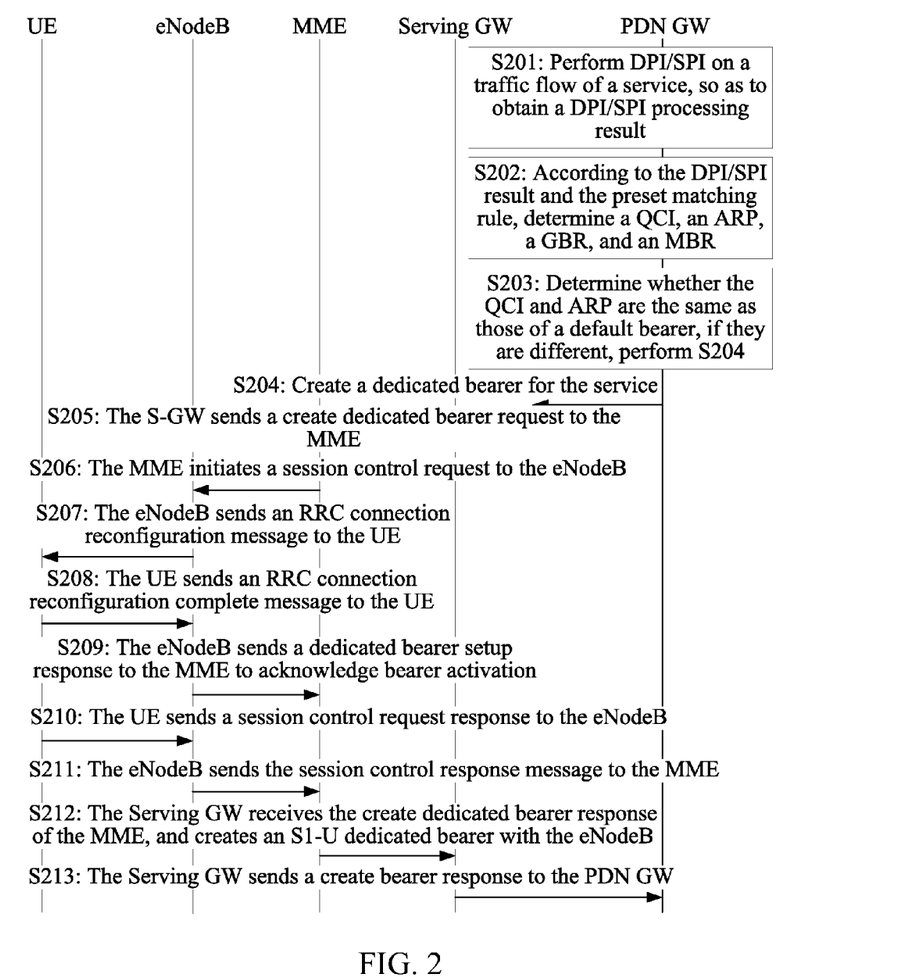
FIG. 2 is an information exchange diagram of a method for processing a bearer according to Embodiment 2 of the present invention.

FIG. 2 is a flow chart of another embodiment of a method for processing a bearer according to the present invention; on the basis of the foregoing embodiment, this embodiment is specifically described by taking a current network environment being a 4G network environment as an example, and specifically, this embodiment includes the following steps as described further below.

S201: According to a preset layer-7 protocol type matching rule, perform depth packet inspection DPI processing on a traffic flow of a service, so as to obtain a DPI processing result. Alternatively, shallow packet inspection SPI processing is performed on a traffic flow of a service according to a preset layer-3 or layer-4 protocol type matching rule so as to obtain an SPI processing result.

S202: According to the DPI/SPI result and the preset matching rule, determine a service QoS class identifier QCI identifying a class quality of the service, an allocation and retention priority ARP, a guaranteed bit rate GBR, and a maximum bit rate MBR.

Because this embodiment is specifically described by taking a current network environment being a 4G network environment as an example, the QoS class identifier is a service QoS class identifier QCI, and a value range of the allocation and retention priority ARP is 1 to 15.

S203: Determine whether the QoS class identifier QCI and the ARP are the same as a QoS class identifier and an allocation and retention priority ARP of a default bearer, and if different, perform S204, and if the same, carry the service through the default bearer.

S204: A PDN GW creates a dedicated bearer for the service, where a TFT of the dedicated bearer is a 5-tuple of the service, and a bandwidth of the dedicated bearer is a sum of the guaranteed bit rate GBR and the maximum bit rate MBR of the service.

Specifically, the PDN GW performs bearer binding through QCI and ARP in QoS information carried in a static policy, and if a new dedicated bearer needs to be created, the PDN GW sends a create dedicated bearer request Create Bearer Request message to a serving gateway Serving GW. The Create Bearer Request includes the following Information element: an international mobile subscriber identity IMSI, a procedure transaction identifier PTI, an evolved packet system bearer quality of service, a TFT, a tunnel endpoint identifier S5/S8 TEID, a Charging Id, a linked EPS bearer identity LBI, and a protocol configuration item.

S205: The Serving GW sends the create dedicated bearer request Create Bearer Request to an MME.

S206: The MME selects a not-used evolved packet system bearer identity to identify a new dedicated bearer. The MME initiates a session control request Session Management Request to an eNodeB. The request carries a PTI, a TFT, an evolved packet system bearer quality of service parameter (the parameter does not include an ARP), a protocol configuration item, an evolved packet system bearer identity, and a linked evolved packet system bearer identity.

S207: The eNodeB maps the evolved packet system bearer quality of service into a radio bearer quality of service, and sends an RRC connection reconfiguration message (RRC Connection Reconfiguration) to a UE. The RRC Connection Reconfiguration includes: radio bearer quality of service, Session Management Request, and an evolved packet system radio bearer identity.

S208: The UE sends an RRC connection reconfiguration complete message Connection Reconfiguration Complete message to the eNodeB, so as to acknowledge activation of a radio bearer.

S209: The eNodeB sends a dedicated bearer setup response Bearer Setup Response message to the MME to acknowledge bearer activation, and indicate whether a requested bearer quality of service requested Bearer QoS can be allocated.

S210: The UE builds a session control request response Session Management Response message of an NAS (non-access stratum) layer including EPS Bearer Identity, and sends it to the eNodeB through a Direct Transfer message, that is, the Session Management Response message.

S211: The eNodeB sends the Session Management Response message to the MME through an uplink non-access stratum NAS transmission message.

S212: The Serving GW receives the create dedicated bearer response Create Bearer Response message of the MME, and creates an S1-U dedicated bearer with the eNodeB.

S213: The Serving GW allocates a tunnel endpoint identifier TEID-U of a data plane at a GTP-based S5/S8 dedicated bearer Serving GW side, and sends the Create Bearer Response to the PDN GW.

In the embodiments of the present invention, perform depth packet inspection DPI/SPI on a traffic flow of a service, so as to obtain a DPI/SPI processing result, and according to the DPI/SPI result and a preset matching rule, determine a service quality attribute parameter of the service, further determine whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increases diversity of a dedicated bearer creating apparatus.

Embodiment 3

Figure 3:
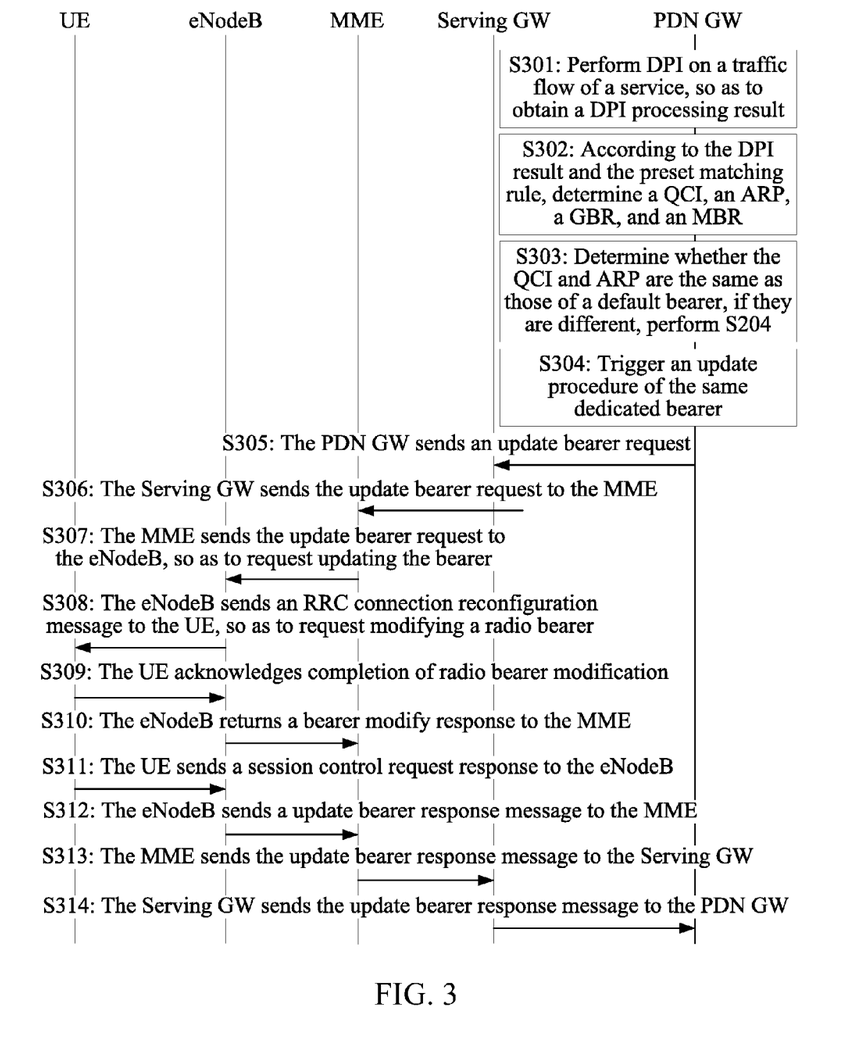
FIG. 3 is an information exchange diagram of a method for processing a bearer according to Embodiment 3 of the present invention.

FIG. 3 is a flow chart of still another embodiment of a method for processing a bearer; on the basis of the foregoing embodiment, this embodiment is specifically described by taking a current network environment being a 4G network environment as an example, and specifically, this embodiment includes the following steps, where, S314 to S323 are the same as S204 to S213 in Embodiment 2, and are not repeatedly described herein. Steps in this embodiment different from those of the foregoing embodiment are described below.

S301: According to a preset layer-7 protocol type matching rule, perform depth packet inspection DPI processing on a traffic flow of a service, so as to obtain a DPI processing result; or according to a preset layer-3 or layer-4 protocol type matching rule, perform shallow packet inspection SPI processing on a traffic flow of a service, so as to obtain an SPI processing result (not shown in the figure).

S302: According to the DPI/SPI result and the preset matching rule, determine a QoS class identifier identifying a quality class of the service, an allocation and retention priority ARP, a guaranteed bit rate GBR, and a maximum bit rate MBR.

S303: Determine whether a dedicated bearer having a QoS class identifier and an ARP the same as the QoS class identifier and ARP of the service exists in the created dedicated bearer, and if not, perform S314, a step of creating a dedicated bearer for the service; and if yes, perform S304.

S304: Use the same dedicated bearer as the dedicated bearer of the service, and trigger an update procedure of the same dedicated bearer.

Specifically, use a 5-tuple of the traffic flow as a TFT parameter of the same dedicated bearer; add the guaranteed bit rate GBR and the maximum bit rate MBR of the same dedicated bearer to the GBR and MBR of the service, so as to obtain an accumulated value of the GBR and MBR; and use the accumulated value of the GBR and MBR as the GBR and MBR of the same dedicated bearer.

In this embodiment, when QOS policies of multiple services of different types defined respectively by a PDN GW in multiple rules are consistent, that is, having the same QCI and ARP parameters, a data service is identified and parsed through shallow packet inspection SPI and DPI; if coming of a first type of traffic flow is sensed, a dedicated bearer creating procedure described in Embodiment 1 is initiated; and if the dedicated bearer to which a QOS policy corresponding to the service belongs has been created, a PGW detects coming of a second type of service, an update procedure on the dedicated bearer is initiated, the QOS policy of the bearer is updated at the same time, and an accumulated value of bearer GBR and MBR of the two types of services is used as a new bearer bandwidth. Accordingly, as for multiple types of services occurring on the dedicated bearer at the same time, an accumulated value of bearer GBR and MBR of the services is used as a new bearer bandwidth.

S305: The PDN GW by using an acquired policy determines that QoS authenticated by a traffic flow is updated, or determines to add or remove a traffic flow to or from an activated dedicated bearer, so as to initiate a dedicated bearer update procedure requiring QoS update. The PDN GW generates an uplink traffic flow template UL TFT and updates an evolved packet system bearer quality of service, and sends an update bearer request Update Bearer Request to a Serving GW.

S306: The Serving GW, after receiving the message, sends an Update Bearer Request message to an MME.

S307: The MME sends a bearer modify request Bearer Modify Request message to an eNodeB, so as to request modifying the bearer.

S308: The eNodeB sends an RRC Connection Reconfiguration message to a user equipment UE, so as to request modifying a radio bearer.

S309: The UE returns an RRC Connection Reconfiguration Complete message to the eNodeB, so as to acknowledge completion of radio bearer modification.

S310: The eNodeB sends a update bearer response Update bearer response message to the MME, so that the bearer modification completes.

S311: The UE sends a Session Management Response message to the eNodeB.

S312: The eNodeB sends a update bearer response Update Bearer Response message to the MME.

S313: The MME sends the update bearer response Update Bearer Response message to the Serving GW.

S314: The Serving GW sends an Update Bearer Response message to the PDN GW.

In the embodiments of the present invention, perform depth packet inspection DPI/SPI on a traffic flow of a service, so as to obtain a DPI/SPI processing result, and according to the DPI/SPI result and a preset matching rule, determine a service quality attribute parameter of the service, further determine whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increases diversity of a dedicated bearer creating apparatus. In addition, according to the number of types of services occurring on the dedicated bearer at the same time, a bandwidth of the dedicated bearer is adjusted through an accumulated value of bearer GBR and MBR of the corresponding services, thereby increasing the adjustability of the dedicated bearer.

Embodiment 4

Figure 4:
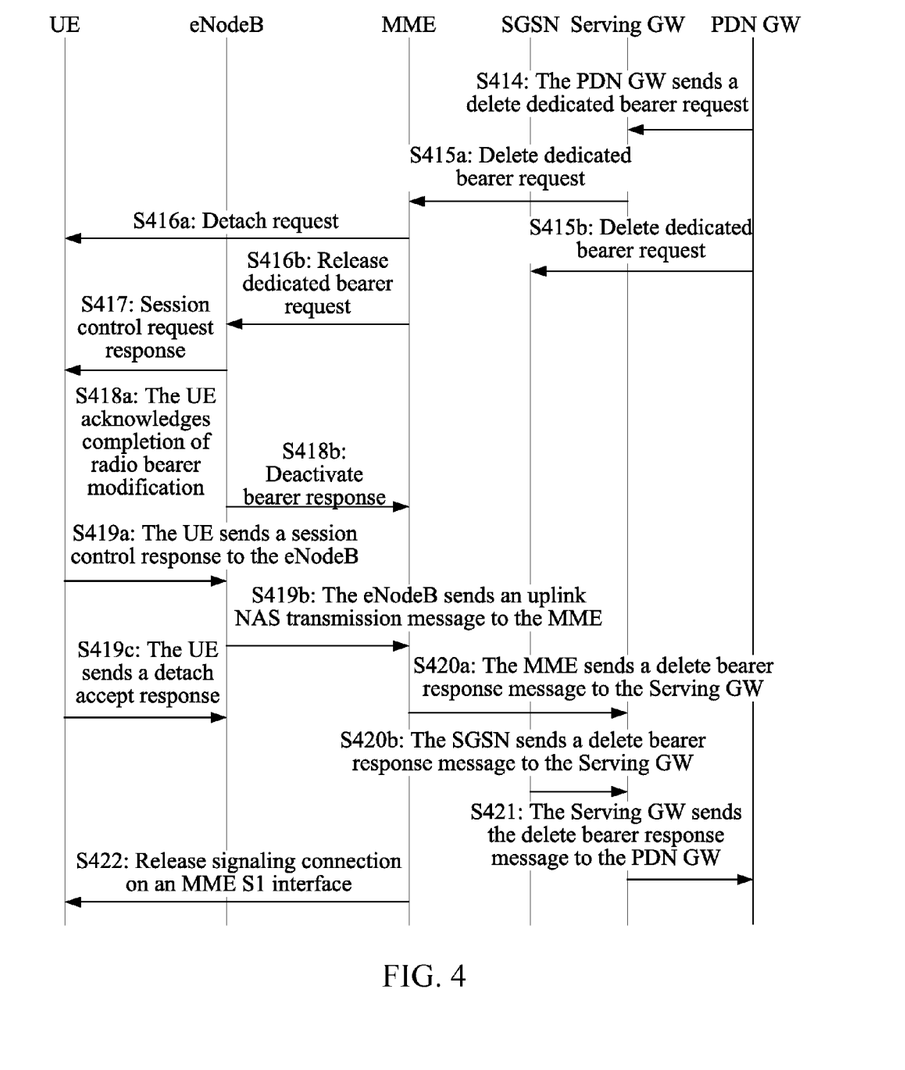
FIG. 4 is an information exchange diagram of a method for processing a bearer according to Embodiment 4 of the present invention.

FIG. 4 is a flow chart of still another embodiment of a method for processing a bearer; on the basis of the foregoing embodiment, this embodiment is specifically described by taking a current network environment being a 4G network environment as an example, and specifically, this embodiment includes the following steps, where, S401 to S413 are the same as S301 to S313 in Embodiment 3, and are not repeatedly described herein. Steps in this embodiment different from those of the foregoing embodiment are described below.

S414: When the dedicated bearer does not receive a traffic flow of the service within a preset period, and/or when it is detected through an SPI/DPI technology that the service is already disconnected and a traffic flow is no longer generated, the dedicated bearer is updated. A TFT parameter related to the traffic flow in the dedicated bearer is deleted.

Preferably, a GBR and an MBR of the service is subtracted from a GBR and an MBR of the dedicated bearer, so as to obtain an updated accumulated value of the GBR and MBR. When all services carried on the dedicated bearer stop transmitting traffic flows, a deletion procedure of the dedicated bearer is initiated so as to delete the dedicated bearer.

Specifically, in this embodiment, if a PDN GW senses that a certain traffic flow triggering a create or update procedure of the dedicated bearer does not receive any packet in a configured time or when it is detected through an SPI/DPI technology that a service packet is no longer generated since the traffic flow is disconnected, initiate, based on 5-tuple information of the traffic flow, a dedicated bearer update procedure to trigger deletion of the TFT of the corresponding dedicated bearer. If a PGW detects that all traffic flows under the dedicated bearer stop transmitting packets, trigger a deletion procedure of the corresponding dedicated bearer, so that the PDN GW determines to initiate a bearer deactivation procedure, and sends a Delete Bearer Request to a Serving GW.

S415a: The Serving GW sends a delete dedicated bearer request Delete Bearer Request message to an MME. The Delete Bearer Request carries a procedure transaction identifier PTI, an evolved packet system bearer identity, and a cause value Causes.

S415b: If an idle mode signaling reduction mechanism ISR is used, the Serving GW sends a Delete Bearer Request message to an SGSN at the same time. The Delete Bearer Request carries a PTI, an evolved packet system bearer identity, and Causes.

S416a: If a to-be-deleted packet data network PDN connection is the last PDN connection of a UE, the deletion is not initiated due to the ISR or the UE handing over to a non-3GPP access, the MME needs to send a detach request Detach Request message to the UE.

S416b: The MME sends a deactivate dedicated bearer request Deactivate Bearer Request to an eNodeB, so as to request deactivating the bearer.

S417: The eNodeB sends an RRC Connection Reconfiguration message to the UE.

S418a: The UE sends an RRC Connection Reconfiguration Complete message to the eNodeB.

S418b: The eNodeB sends a deactivate bearer response Deactivate Bearer Response to the MME.

S419a: The UE sends a session control response to the eNodeB.

S419b: The eNodeB sends an uplink NAS transmission message to the MME.

S419c: If the UE sends the Detach Request message sent by the MME, the UE needs to send a detach accept response Detach Accept message to the MME.

S420a: The MME sends a delete bearer response Delete Bearer Response message to the Serving GW.

S420b: The SGSN sends a delete bearer response Delete Bearer Response message to the Serving GW.

S421: If the ISR is activated, and after the Delete Bearer Response of the MME and the Delete Bearer Response of the SGSN are received by an S-GW, or if the ISR is not activated, and after the Delete Bearer Response of the MME is received by an S-GW, the S-GW deletes a bearer context related to itself, and sends a delete bearer command Delete Bearer Command to a P-GW. If the procedure is caused by a session termination message IP CAN Session Termination initiated by a PCRF, the P-GW further needs to return a response to the PCRF.

S422: If Detach occurs in the UE, the MME sends a release command Release Command message to the eNodeB, and releases signaling connection on an MME S1 interface.

In the embodiments of the present invention, perform depth packet inspection DPI/SPI on a traffic flow of a service, so as to obtain a DPI/SPI processing result, and according to the DPI/SPI result and a preset matching rule, determine a service quality attribute parameter of the service, further determine whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increases diversity of a dedicated bearer creating apparatus.

Embodiment 5

Figure 5:
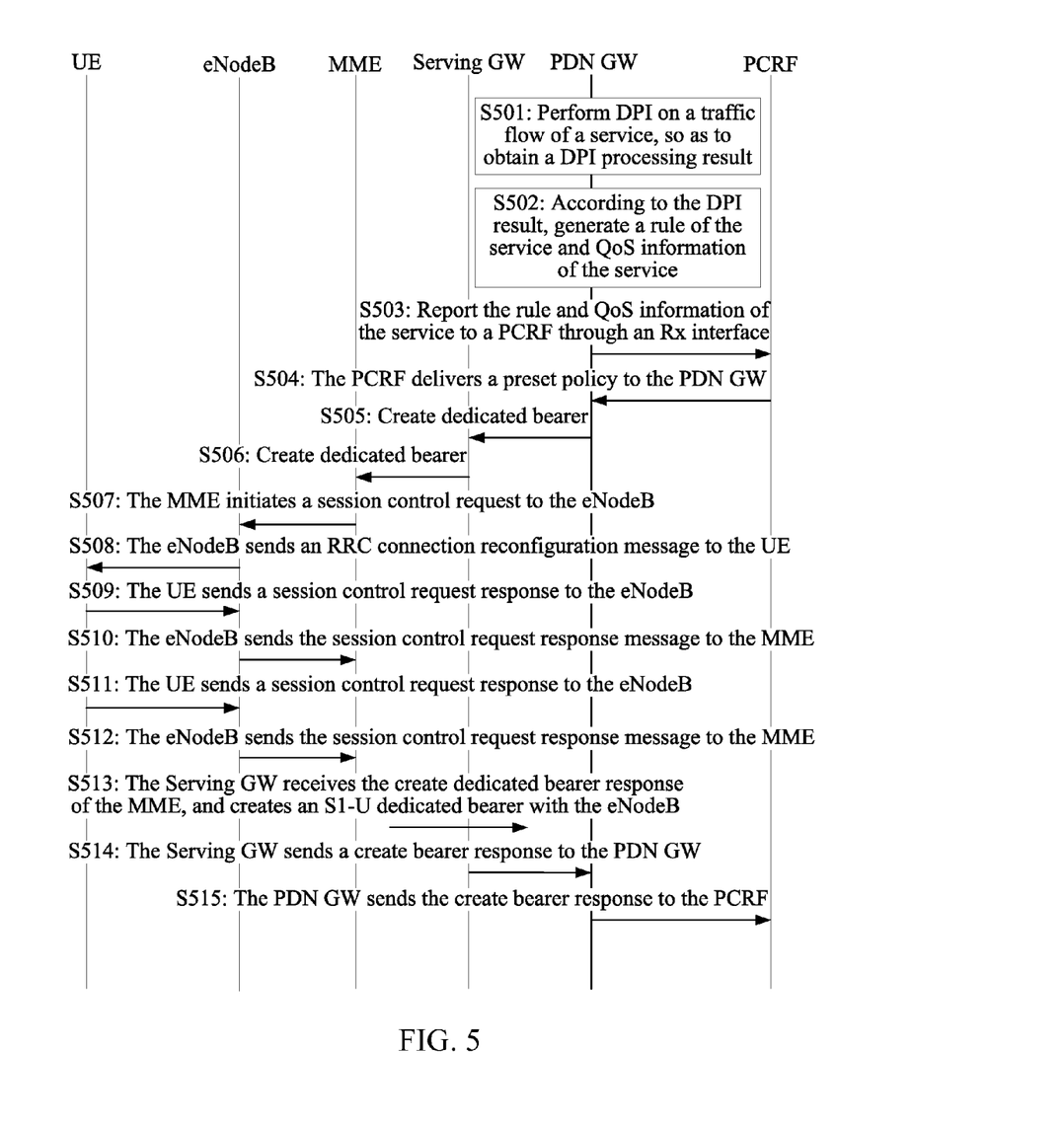
FIG. 5 is an information exchange diagram of a method for processing a bearer according to Embodiment 5 of the present invention.

FIG. 5 is a flow chart of still another embodiment of a method for processing a bearer, and specifically, this embodiment includes the following steps:

S501: According to a preset layer-7 protocol type matching rule, perform depth packet inspection DPI processing on a traffic flow of a service, so as to obtain a DPI processing result; or according to a preset layer-3 or layer-4 protocol type matching rule, perform shallow packet inspection SPI processing on a traffic flow of a service, so as to obtain an SPI processing result (not shown in the figure).

S502: According to the DPI/SPI result and the preset matching rule, determine a service quality attribute parameter of the service. The service quality attribute parameter specifically includes a QoS class identifier identifying a quality class of the service and an allocation and retention priority ARP.

S503: Report QoS information of the service to a PCRF through an Rx interface, so that the PCRF creates a dedicated bearer of the service according to the service and the QoS information of the service.

Specifically, the PDN GW distinguishes data packets to different traffic flows through a capability of the DPI/SPI, generates a rule of the traffic flow and the QoS information, and reports them to the PCRF through the Rx interface, so that the PCRF creates the dedicated bearer of the service according to the service and the QoS information of the service.

S504: The PCRF delivers a PCC preset policy Decision Provision to the PDN GW, where the Decision Provision carries QoS.

S505: The PDN GW executes bearer binding through QCI and ARP in the QoS information carried in the PCC policy. If it is required to create a new dedicated bearer, the PDN GW sends a Create Bearer Request message to a Serving GW. The Create Bearer Request message carries the following information element: an IMSI, a PTI, an evolved packet system bearer quality of service, a TFT, an S5/S8 TEID, a Charging Id, a linked EPS bearer identity LBI, and a protocol configuration item.

S506: The Serving GW sends the create dedicated bearer request Create Bearer Request to an MME. Information element carried in the create dedicated bearer request include: an IMSI, a PTI, an EPS evolved packet system bearer quality of service, a TFT, an S1-TEID, an LBI, and a protocol configuration item.

S507: The MME selects a not-used evolved packet system bearer identity to identify a new dedicated bearer. The MME initiates a Session Management Request message to an eNodeB. The message carries the PTI, the TFT, an evolved packet system bearer quality of service parameter (the parameter does not include an ARP), an evolved packet system bearer identity, and a linked evolved packet system bearer identity.

S508: The eNodeB maps the evolved packet system bearer quality of service into a radio bearer quality of service Radio Bearer QoS, and sends an RRC Connection Reconfiguration message to a UE. The RRC Connection Reconfiguration message carries: the Radio Bearer QoS, the Session Management Request, and an EPS RB Identity.

S509: The UE sends an RRC Connection Reconfiguration Complete message to the eNodeB to acknowledge activation of a radio bearer.

S510: The eNodeB sends a Bearer Setup Response to the MME to acknowledge activation of a bearer, and indicates whether the requested Bearer QoS can be allocated.

S511: The UE builds an NAS layer including a Session Management Response message of the EPS Bearer Identity, and sends it to the eNodeB through a Direct Transfer message, that is, the Session Management Response message.

S512: The eNodeB sends the Session Management Response message to the MME through an uplink NAS transmission message.

S513: The Serving GW receives the Create Bearer Response of the MME, and creates an S1-U dedicated bearer with the eNodeB.

S514: The Serving GW allocates a TEID-U at a GTP-based S5/S8 dedicated bearer Serving GW side, and sends a create dedicated bearer response Create Bearer Response to the PDN GW.

S515: The PDN GW sends a create bearer response to the PCRF.

In the embodiment of the present invention, perform depth packet inspection DPI/SPI on a traffic flow of a service, so as to obtain a DPI/SPI processing result, and according to the DPI/SPI result and a preset matching rule, determine a service quality attribute parameter of the service, and report QoS information of the service to a PCRF through an Rx interface, so that the PCRF creates a dedicated bearer of the service according to the service and the QoS information of the service, which increases information sources required by the PCRF for creating a dedicated bearer and therefore increases diversity of a dedicated bearer creating apparatus.

Embodiment 6

Figure 6:
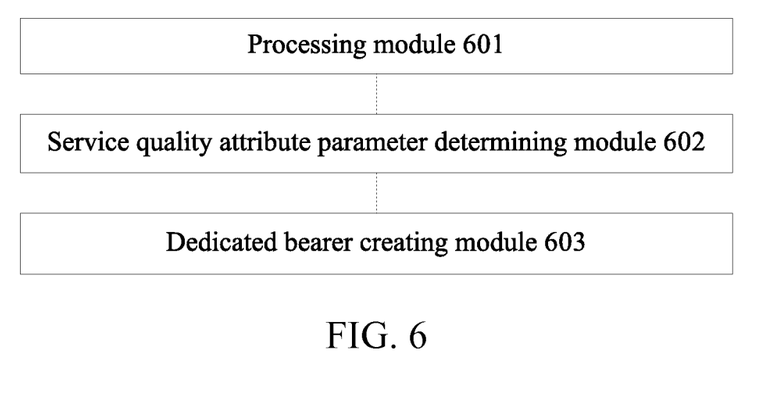
FIG. 6 is a schematic structural diagram of an apparatus for processing a bearer according to Embodiment 6 of the present invention.

FIG. 6 is a schematic structural diagram of an embodiment of an apparatus for processing a bearer according to the present invention; the apparatus is mainly configured to implement the method provided in Embodiment 1, and an application environment thereof is the same as that of the method embodiment of the present invention, which is not repeatedly described herein, and a specific working procedure may also be obtained with reference to the foregoing method embodiment. The apparatus includes a processing module 601 configured to perform depth packet inspection DPI processing on a traffic flow of a service according to a preset layer-7 protocol type matching rule so as to obtain a DPI processing result. Alternatively, the processing module 601 is configured to perform shallow packet inspection SPI processing on a traffic flow of a service according to a preset layer-3 or layer-4 protocol type matching rule so as to obtain an SPI processing result. A service quality attribute parameter determining module 602 is configured to determine a service quality attribute parameter of the service according to the DPI result and the preset matching rule. Alternatively, a service quality attribute parameter of the service is determined according to the SPI result and the preset matching rule. A dedicated bearer creating module 603 is configured to determine whether the service quality attribute parameter is the same as a service quality attribute parameter of an existing bearer, and if different, create a dedicated bearer for the service.

In the embodiment of the present invention, perform depth packet inspection DPI/SPI on a traffic flow of a service, so as to obtain a DPI/SPI processing result, and according to the DPI/SPI result and a preset matching rule, determine a service quality attribute parameter of the service, further determine whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increases diversity of a dedicated bearer creating apparatus.

Embodiment 7

Figure 7:
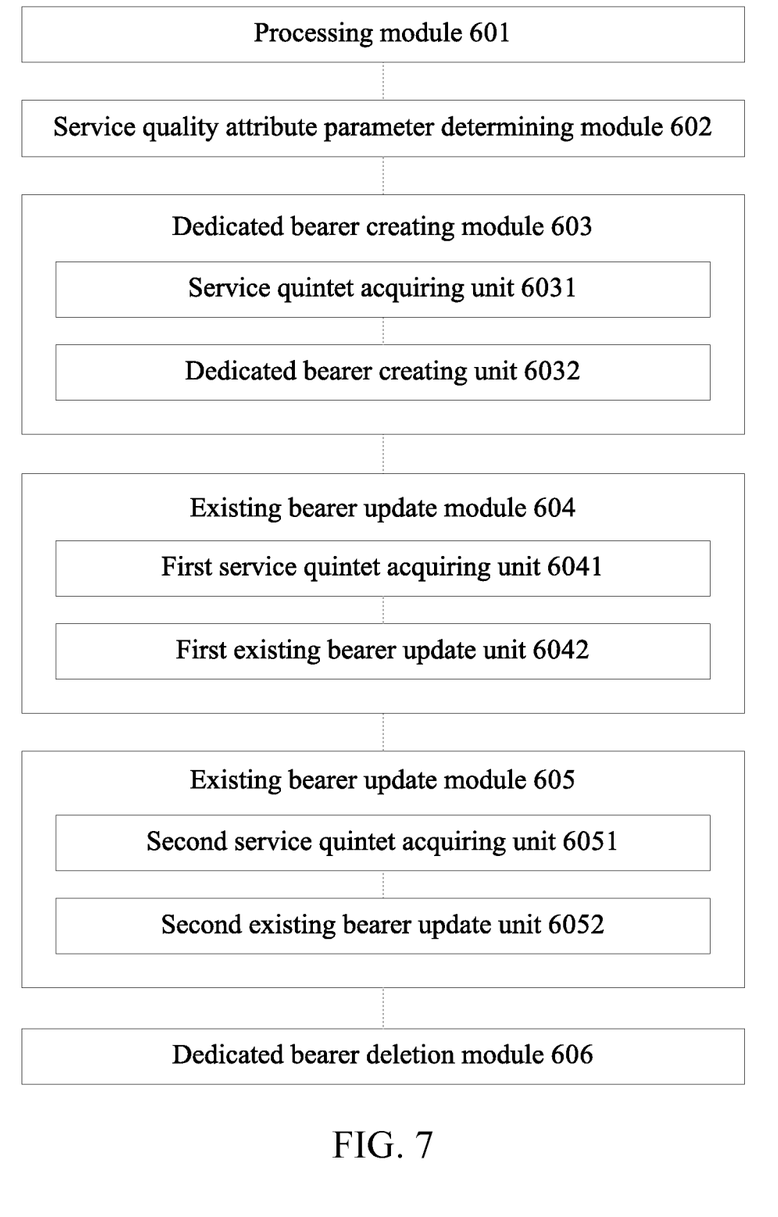
FIG. 7 is a schematic structural diagram of an apparatus for processing a bearer according to Embodiment 7 of the present invention.

FIG. 7 is a schematic structural diagram of another embodiment of an apparatus for processing a bearer, and on the basis of Embodiment 6, a service quality attribute parameter of the service specifically includes: a QoS class identifier identifying a quality class of the service and an allocation and retention priority ARP.

The dedicated bearer creating module 603 is configured to determine whether the QoS class identifier and the ARP are the same as a QoS class identifier and an ARP of an existing bearer, if at least one is different, create a dedicated bearer for the service.

When the current network environment is a 3G network environment, the QoS class identifier is a traffic class Traffic Class. Alternatively, when the current network environment is a 4G network environment, the QoS class identifier is a service QoS class identifier QCI.

The dedicated bearer creating module 603 specifically includes a service 5-tuple acquiring unit 6031 configured to acquire a 5-tuple of the service, and a GBR and an MBR of the service. A dedicated bearer creating unit 6032 is configured to create a dedicated bearer of the service according to the 5-tuple of the service and the GBR and MBR of the service. A traffic flow template TFT parameter of the dedicated bearer is the 5-tuple of the service, and a bandwidth of the dedicated bearer is a sum of the GBR and the MBR of the service.

The existing bearer is a default bearer or an existing dedicated bearer.

The apparatus further includes an existing bearer update module 604 configured to trigger an update procedure of the existing bearer when it is determined that the service quality attribute parameter is different from a service quality attribute parameter of the existing bearer.

In the existing bearer update module 604, the service quality attribute parameter of the service specifically includes: a QoS class identifier identifying a quality class of the service and an allocation and retention priority ARP.

The existing bearer update module 604 is specifically configured to determine whether the QoS class identifier and the ARP are the same as a QoS class identifier and an ARP of the existing bearer, and if the same, trigger an update procedure of the existing bearer. The existing bearer is a default bearer or an existing dedicated bearer.

When the existing bearer is a default bearer, the existing bearer update module 604 is specifically configured to send a default bearer update request.

When the existing bearer is an existing dedicated bearer, the existing bearer update module 604 includes a first service 5-tuple acquiring unit 6041 configured to acquire a 5-tuple of the service, and a GBR and an MBR of the service. A first existing bearer update unit 6042 is configured to add the 5-tuple of the traffic flow to the TFT parameter of the existing dedicated bearer, add a GBR and an MBR of the existing dedicated bearer to the GBR and MBR of the service so as to obtain an accumulated value of the GBR and MBR, and use the accumulated value of the GBR and MBR as the GBR and MBR of the existing dedicated bearer.

The apparatus further includes an existing bearer update module 605 configured to update the existing bearer when the existing bearer does not receive a traffic flow of the service within a preset period, and/or when it is detected through an SPI/DPI technology that the service is already disconnected and a traffic flow is no longer generated.

When the existing bearer is an existing dedicated bearer, the existing bearer update module 605 further includes a second service 5-tuple acquiring unit 6051 and a second existing bearer update unit 6052. The second service 5-tuple acquiring unit 6051 is configured to acquire a 5-tuple of the service, and a GBR and an MBR of the service. The second existing bearer update unit 6052 is configured to subtract the 5-tuple of the traffic flow from the TFT parameter of the existing dedicated bearer, subtract the GBR and MBR of the service from a GBR and an MBR of the dedicated bearer so as to obtain an updated accumulated value of the GBR and MBR, and use the updated accumulated value of the GBR and MBR as the GBR and MBR of the dedicated bearer.

A dedicated bearer deletion module 606 is configured to initiate a deletion procedure of the dedicated bearer so as to delete the dedicated bearer when all services carried by the dedicated bearer stop transmitting traffic flows.

In the embodiments of the present invention, perform depth packet inspection DPI/SPI on a traffic flow of a service, so as to obtain a DPI/SPI processing result, and according to the DPI/SPI result and a preset matching rule, determine a service quality attribute parameter of the service, further determine whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increases diversity of a dedicated bearer creating apparatus. For a specific working procedure of the apparatus in the specific embodiment, reference may also be made to the method embodiments in this specification.

Embodiment 8

Figure 8:
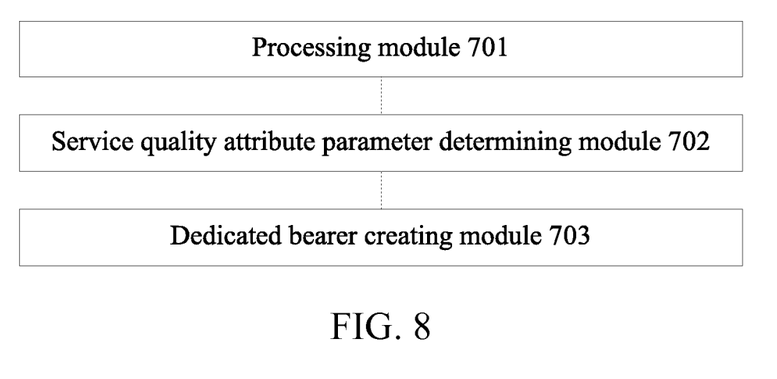
FIG. 8 is a schematic structural diagram of an apparatus for processing a bearer according to Embodiment 7 of the present invention.

FIG. 8 is a schematic structural diagram of another embodiment of an apparatus for processing a bearer, and the apparatus includes a processing module 701 configured to perform depth packet inspection DPI processing on a traffic flow of a service according to a preset layer-7 protocol type matching rule so as to obtain a DPI processing result. Alternatively, the processing module 701 is configured to perform shallow packet inspection SPI processing on a traffic flow of a service according to a preset layer-3 or layer-4 protocol type matching rule so as to obtain an SPI processing result. A service quality attribute parameter determining module 702 is configured to determine a service quality attribute parameter of the service according to the DPI/SPI result and the preset matching rule. The service quality attribute parameter includes a QoS class identifier identifying a quality class of the service and an allocation and retention priority ARP. A dedicated bearer creating module 703 is configured to report the service quality attribute parameter of the service to a PCRF through an Rx interface, so that the PCRF creates a dedicated bearer of the service according to the service quality attribute parameter of the service.

In the embodiments of the present invention, perform depth packet inspection DPI/SPI on a traffic flow of a service, so as to obtain a DPI/SPI processing result, and according to the DPI/SPI result and a preset matching rule, determine a service quality attribute parameter of the service, further determine whether the service quality attribute parameter is the same as a service quality attribute parameter of an existing bearer, and if different, create a dedicated bearer for the service, so as to implement that a dedicated bearer of a corresponding service is created by a PDN GW only through performing depth packet inspection DPI/SPI processing on the traffic flow of the service without the need of creating a dedicated bearer through a PCRF, which increases diversity of a dedicated bearer creating apparatus. For a specific working procedure of the apparatus in the specific embodiment, reference may also be made to the method embodiments in this specification.

A person of ordinary skill in the art may understand that all or a part of the steps of the foregoing embodiments may be implemented by hardware, and may also be implemented by program instructing relevant hardware. The program may be stored in a computer readable storage medium. The storage medium may be a read-only memory, a magnetic disk, an optical disc, or the like.

The foregoing description is merely exemplary embodiments of the present invention, but is not intended to limit the present invention. Any modifications, equivalent replacements, or improvements made within the spirit and principle of the present invention shall fall within the protection scope of the present invention.

What is claimed is:

1. A method for processing a bearer comprising:
performing deep packet inspection (DPI) processing on a traffic flow of a service according to a preset layer-7 protocol type matching rule so as to obtain a DPI processing result, or performing shallow packet inspection (SPI) processing on a traffic flow of a service according to a preset layer-3 or layer-4 protocol type matching rule so as to obtain a SPI processing result;
determining a service quality attribute parameter of the service according to the DPI result and the preset matching rule or according to the SPI result and the preset matching rule; and
determining whether the service quality attribute parameter is the same as a service quality attribute parameter of an existing bearer, and if different, creating a dedicated bearer for the service, wherein creating the dedicated bearer for the service comprises:
acquiring a 5-tuple of the service, and a guaranteed bit rate (GBR) and a maximum bit rate (MBR) of the service; and
according to the 5-tuple of the service and the GBR and MBR of the service, creating a dedicated bearer of the service, wherein a traffic flow template TFT parameter of the dedicated bearer is the 5-tuple of the service, and a bandwidth of the dedicated bearer is a sum of the GBR and the MBR of the service.

2. The method according to claim 1, wherein, the service quality attribute parameter of the service specifically comprises: a QoS class identifier identifying a quality class of the service and an allocation and retention priority (ARP); and
a step of determining whether the service quality attribute parameter is the same as a service quality attribute parameter of an existing bearer, and if different, creating a dedicated bearer for the service specifically comprises:
determining whether the QoS class identifier and the ARP are the same as a QoS class identifier and an ARP of the existing bearer, and if at least one is different, creating a dedicated bearer for the service.

3. The method according to claim 1, further comprising:
when it is determined that the service quality attribute parameter is the same as the service quality attribute parameter of the existing bearer, triggering an update procedure of the existing bearer.

4. The method according to claim 3, wherein, the service quality attribute parameter of the service specifically comprises: a QoS class identifier identifying a quality class of the service and an allocation and retention priority ARP; and
a step of triggering an update procedure of the existing bearer when it is determined that the service quality attribute parameter is the same as the service quality attribute parameter of the existing bearer specifically comprises:
determining whether the QoS class identifier and the ARP are the same as the QoS class identifier and the ARP of the existing bearer, and if the same, triggering an update procedure of the existing bearer.

5. The method according to claim 3, wherein, when the existing bearer is an existing dedicated bearer, the triggering an update procedure of the existing bearer comprises:
acquiring a 5-tuple of the service, and a GBR and an MBR of the service;
adding the 5-tuple of the traffic flow into a TFT parameter of the existing dedicated bearer, and adding a GBR and an MBR of the existing dedicated bearer to the GBR and MBR of the service so as to obtain an accumulated value of the GBR and MBR; and
using the accumulated value of the GBR and MBR as the GBR and MBR of the existing dedicated bearer.

6. The method according to claim 1, further comprising:
when the existing bearer does not receive a traffic flow of the service within a preset period, and/or when it is detected through an SPI/DPI technology that the service is already disconnected and a traffic flow is no longer generated, updating the existing bearer.

7. The method according to claim 6, wherein, when the existing bearer is an existing dedicated bearer, the triggering an update procedure of the existing bearer further comprises:
acquiring a 5-tuple of the service, and a GBR and an MBR of the service;
subtracting the 5-tuple of the traffic flow from a TFT parameter of the existing dedicated bearer;
subtracting the GBR and MBR of the service from the GBR and MBR of the dedicated bearer so as to obtain an updated accumulated value of the GBR and MBR; and
using the updated accumulated value of the GBR and MBR as the GBR and MBR of the dedicated bearer.

8. The method according to claim 1, further comprising:
when all services carried by the dedicated bearer stop transmitting traffic flows, initiating a deletion procedure of the dedicated bearer, so as to delete the dedicated bearer.

9. A method for processing a bearer, the method comprising:
according to a preset layer-3 or layer-4 protocol type matching rule, performing shallow packet inspection SPI processing on a traffic flow of a service, so as to obtain an SPI processing result;
according to the SPI result and the preset matching rule, determining a service quality attribute parameter of the service;
reporting the service quality attribute parameter of the service to a PCRF through an Rx interface, so that the PCRF creates a dedicated bearer of the service according to the service quality attribute parameter of the service, wherein creating the dedicated bearer comprises:
acquiring a 5-tuple of the service, and a guaranteed bit rate (GBR) and a maximum bit rate (MBR) of the service; and
according to the 5-tuple of the service and the GBR and MBR of the service, creating a dedicated bearer of the service, wherein a traffic flow template (TFT) parameter of the dedicated bearer is the 5-tuple of the service, and a bandwidth of the dedicated bearer is a sum of the GBR and the MBR of the service.

10. An apparatus for processing a bearer, comprising:
a processing module configured to:
perform deep packet inspection (DPI) processing on a traffic flow of a service according to a preset layer-7 protocol type matching rule so as to obtain a DPI processing result, or
perform shallow packet inspection SPI processing on a traffic flow of a service according to a preset layer-3 or layer-4 protocol type matching rule so as to obtain an SPI processing result;
a service quality attribute parameter determining module configured to determine a service quality attribute parameter of the service according to the DPI result and the preset matching rule, or according to the SPI result and the preset matching rule; and a dedicated bearer creating module configured to determine whether the service quality attribute parameter is the same as a service quality attribute parameter of an existing bearer, and if different, create a dedicated bearer for the service, wherein creating the dedicated bearer comprises:

acquiring a 5-tuple of the service, and a guaranteed bit rate (GBR) and a maximum bit rate (MBR) of the service; and create a dedicated bearer of the service, according to the 5-tuple of the service and the GBR and MBR of the service, wherein a traffic flow template TFT parameter of the dedicated bearer is the 5-tuple of the service, and a bandwidth of the dedicated bearer is a sum of the GBR and the MBR of the service.

11. The apparatus according to claim 10, wherein the service quality attribute parameter of the service specifically comprises a QoS class identifier identifying a quality class of the service and an allocation and retention priority ARP; and wherein the dedicated bearer creating module-is specifically configured to determine whether the QoS class identifier and the ARP are the same as a QoS class identifier and an ARP of the existing bearer, and if at least one is different, create a dedicated bearer for the service.

12. The apparatus according to claim 10, wherein the existing bearer is a default bearer or an existing dedicated bearer.

13. The apparatus according to claim 10, further comprising:

an existing bearer update module configured to trigger an update procedure of the existing bearer when it is determined that the service quality attribute parameter is the same as a service quality attribute parameter of the existing bearer.

14. The apparatus according to claim 13, wherein the service quality attribute parameter of the service comprises a QoS class identifier identifying a quality class of the service and an allocation and retention priority ARP.

15. The apparatus according to claim 13, wherein, when the existing bearer is an existing dedicated bearer, the existing bearer update module comprises:

a first service 5-tuple acquiring unit configured to acquire a 5-tuple of the service, and a GBR and an MBR of the service; and a first existing bearer update unit configured to add the 5-tuple of the traffic flow to the TFT parameter of the existing dedicated bearer, add a GBR and an MBR of the existing dedicated bearer to the GBR and MBR of the service so as to obtain an accumulated value of the GBR and MBR, and use the accumulated value of the GBR and MBR as the GBR and MBR of the existing dedicated bearer.

16. The apparatus according to claim 13, wherein, when the existing bearer is an existing dedicated bearer, the existing bearer update module further comprises:

a second service 5-tuple acquiring unit configured to acquire a 5-tuple of the service, and a GBR and an MBR of the service; and a second existing bearer update unit configured to subtract the 5-tuple of the traffic flow from the TFT parameter of the existing dedicated bearer, subtract the GBR and MBR of the service from a GBR and an MBR of the dedicated bearer so as to obtain an updated accumulated value of the GBR and MBR, and use the updated accumulated value of the GBR and MBR as the GBR and MBR of the dedicated bearer.

17. An apparatus for processing a bearer comprising:
a processing module configured to:
perform shallow packet inspection SPI processing on a traffic flow of a service according to a preset layer-3 or layer-4 protocol type matching rule so as to obtain an SPI processing result;
a service quality attribute parameter determining module configured to determine a service quality attribute parameter of the service according to the SPI processing result and the preset matching rule or according to the SPI processing result and the preset matching rule; and
a dedicated bearer creating module configured to report the service quality attribute parameter of the service to a PCRF through an Rx interface so that the PCRF creates a dedicated bearer of the service according to the service quality attribute parameter of the service, wherein creating the dedicated bearer comprises:
acquiring a 5-tuple of the service, and a guaranteed bit rate (GBR) and a maximum bit rate (MBR) of the service; and
according to the 5-tuple of the service and the GBR and MBR of the service, creating a dedicated bearer of the service, wherein a traffic flow template (TFT) parameter of the dedicated bearer is the 5-tuple of the service, and a bandwidth of the dedicated bearer is a sum of the GBR and the MBR of the service.

18. The apparatus according to claim 17, wherein the service quality attribute parameter specifically comprises a QoS class identifier identifying a quality class of the service and an allocation and retention priority ARP.

* * * * *